United States Patent
Curran et al.

(10) Patent No.: US 9,119,979 B2
(45) Date of Patent: Sep. 1, 2015

(54) METHOD OF CONTROLLING A POWERED AIR PURIFYING RESPIRATOR

(75) Inventors: Desmond T. Curran, Durham (GB); Andrew Murphy, Ferryhill (GB); Alan Lee, Loughborough (GB); Vladimir Dubrovskii, St. Petersburg (RU); Bengt Kallman, Leksand (SE); Bengt Garbergs, Falun (SE)

(73) Assignee: 3M Innovative Properties Company, St. Paul, MN (US)

( * ) Notice: Subject to any disclaimer, the term of this patent is extended or adjusted under 35 U.S.C. 154(b) by 672 days.

(21) Appl. No.: 13/389,825

(22) PCT Filed: Aug. 11, 2010

(86) PCT No.: PCT/US2010/045107
§ 371 (c)(1),
(2), (4) Date: Feb. 10, 2012

(87) PCT Pub. No.: WO2011/019778
PCT Pub. Date: Feb. 17, 2011

(65) Prior Publication Data
US 2012/0138051 A1  Jun. 7, 2012

(30) Foreign Application Priority Data
Aug. 11, 2009  (GB) .................................. 0914013.8

(51) Int. Cl.
*A62B 18/00* (2006.01)
*A62B 7/10* (2006.01)
(Continued)

(52) U.S. Cl.
CPC .................. *A62B 18/006* (2013.01); *A62B 7/10* (2013.01); *F04D 25/08* (2013.01); *F04D 27/004* (2013.01)

(58) Field of Classification Search
CPC ............ A61M 16/00; A61M 16/0069; A61M 16/0051; A61M 16/0057; A61M 16/0063; A61M 16/206; A61M 16/205; A62B 7/10; A62B 18/006; A62B 9/022; A62B 19/00; H02P 6/165; B63C 11/32; B63C 11/24; A01N 1/02; A01N 1/0247; F04D 27/004; F04D 25/08

USPC ............ 128/200.24, 201.25, 201.29, 204.21, 128/204.23, 204.26, 204.28, 205.24, 128/201.24, 201.28, 205.12, 205.13, 128/205.22, 205.25, 204.18, 202.22, 128/205.17, 205.23, 205.11, 205.28, 128/205.27, 202.19, 898; 73/1.62; 251/118, 251/127; 435/1.2; 388/809, 800; 700/282; 417/38
See application file for complete search history.

(56) References Cited

U.S. PATENT DOCUMENTS 4,590,951 A  *  5/1986  O'Connor ................ 128/204.23
4,886,056 A     12/1989  Simpson
(Continued)

FOREIGN PATENT DOCUMENTS

CN    2770703    4/2006
DE    3032371    3/1982
(Continued)

OTHER PUBLICATIONS

International Search Report from Application No. PCT/US2010/045107 dated Dec. 8, 2010.
(Continued)

*Primary Examiner* — Annette Dixon
(74) *Attorney, Agent, or Firm* — Eric D. Levinson

(57) ABSTRACT

A method of controlling a powered air purifying respirator blower system to deliver a substantially uniform volumetric airflow to a user includes the steps of determining one of (a) ambient air density or (b) ambient air temperature and ambient air pressure, and adjusting an electrical characteristic of the electric motor in response to the determination and the at least two calibration values. The powered air purifying respirator blower system may include a fan powered by an electric motor, the motor being controlled by an electronic control unit for delivering a forced flow of filtered air to a user. In some embodiments, the electronic control unit may be operable to adjust an electrical characteristic of the motor in accordance with a predetermined correlation between the speed of the fan and the applied motor electrical characteristic for a selected substantially uniform volumetric airflow from the fan.

15 Claims, 3 Drawing Sheets

(51) Int. Cl.
*F04D 25/08* (2006.01)
*F04D 27/00* (2006.01)

(56) References Cited

U.S. PATENT DOCUMENTS

| | | | |
|---|---|---|---|
| 4,971,052 | A | 11/1990 | Edwards |
| 5,303,701 | A | 4/1994 | Heins |
| 5,318,020 | A | 6/1994 | Schegerin |
| 5,447,414 | A | 9/1995 | Nordby |
| 5,449,275 | A * | 9/1995 | Gluszek et al. ............... 417/14 |
| 5,577,496 | A * | 11/1996 | Blackwood et al. ...... 128/201.25 |
| 5,671,730 | A | 9/1997 | Ollila |
| 5,715,812 | A | 2/1998 | Deighan |
| 5,823,187 | A | 10/1998 | Estes |
| 5,906,203 | A | 5/1999 | Klockseth |
| 5,950,621 | A * | 9/1999 | Klockseth et al. ....... 128/204.26 |
| 6,076,523 | A | 6/2000 | Jones |
| 6,123,074 | A | 9/2000 | Hete |
| 6,237,592 | B1 * | 5/2001 | Surjadi et al. ............ 128/204.21 |
| 6,349,724 | B1 | 2/2002 | Burton |
| 6,435,180 | B1 * | 8/2002 | Hewson et al. .......... 128/204.18 |
| 6,462,494 | B1 | 10/2002 | Schone |
| 6,571,599 | B1 * | 6/2003 | Surjadi et al. ................ 73/1.62 |
| 6,644,310 | B1 | 11/2003 | Delache |
| 6,666,209 | B2 * | 12/2003 | Bennett et al. ........... 128/200.24 |
| 6,712,876 | B2 | 3/2004 | Cao |
| 6,730,927 | B1 | 5/2004 | Smith |
| 6,837,239 | B2 * | 1/2005 | Beizndtsson et al. .... 128/201.25 |
| 6,910,481 | B2 | 6/2005 | Kimmel |
| 6,968,842 | B1 | 11/2005 | Truschel |
| 7,044,129 | B1 | 5/2006 | Truschel |
| 7,188,621 | B2 | 3/2007 | DeVries |
| 7,244,106 | B2 | 7/2007 | Kallman |
| 7,574,386 | B2 | 8/2009 | Hahn-Carlson |
| 7,607,437 | B2 * | 10/2009 | Boyle et al. .............. 128/204.21 |
| 8,677,995 | B2 * | 3/2014 | Boyle et al. .............. 128/204.21 |
| 2002/0062830 | A1 | 5/2002 | Meier et al. |
| 2002/0195105 | A1 | 12/2002 | Blue |
| 2003/0024529 | A1 * | 2/2003 | Beizndtsson et al. .... 128/201.29 |
| 2003/0223877 | A1 | 12/2003 | Anstine |
| 2004/0182394 | A1 | 9/2004 | Alvey |
| 2004/0211423 | A1 | 10/2004 | Baecke |
| 2004/0226561 | A1 | 11/2004 | Colla et al. |
| 2005/0031322 | A1 * | 2/2005 | Boyle et al. .................... 388/800 |
| 2005/0103343 | A1 | 5/2005 | Gossweiler |
| 2005/0263155 | A1 | 12/2005 | Gossweiler |
| 2006/0096596 | A1 | 5/2006 | Occhialini |
| 2006/0191533 | A1 | 8/2006 | Brookman |
| 2006/0283450 | A1 | 12/2006 | Shissler |
| 2007/0102280 | A1 | 5/2007 | Hunter |
| 2008/0092892 | A1 * | 4/2008 | Boyle et al. .............. 128/204.21 |
| 2008/0092893 | A1 * | 4/2008 | Boyle et al. .............. 128/204.21 |
| 2008/0127979 | A1 | 6/2008 | Becker |
| 2009/0266361 | A1 | 10/2009 | Bilger |
| 2012/0017906 | A1 | 1/2012 | Hansmann |
| 2012/0138051 | A1 * | 6/2012 | Curran et al. ............ 128/201.25 |

FOREIGN PATENT DOCUMENTS

| | | |
|---|---|---|
| EP | 0056148 | 7/1982 |
| EP | 164946 | 12/1985 |
| EP | 0518538 | 12/1992 |
| EP | 0518538 A2 | 12/1992 |
| EP | 1039139 A1 | 9/2000 |
| EP | 1197244 A2 | 4/2002 |
| FR | 2709066 | 2/1995 |
| GB | 2032284 | 5/1980 |
| GB | 2045090 | 10/1980 |
| GB | 2215216 | 9/1989 |
| GB | 2338665 | 12/1999 |
| WO | WO 01/80952 | 11/2001 |
| WO | WO 02/23298 A1 | 3/2002 |
| WO | WO 2004/020031 | 3/2004 |
| WO | WO 2005/087319 A1 | 9/2005 |
| WO | WO 2006/008042 | 1/2006 |
| WO | WO 2006/047826 A1 | 5/2006 |
| WO | 2006/108042 | 11/2006 |
| WO | WO 2007/056720 | 5/2007 |
| WO | WO 2007/062843 | 6/2007 |
| WO | WO 2005111412 A3 * | 12/2007 |
| WO | WO 2009/067583 | 5/2009 |

OTHER PUBLICATIONS

MSA 2007 Annual Report, retrieved from the internet on Aug. 14, 2012, http://media.msanet.com/www/annual_reports/2007/year.html.

* cited by examiner

METHOD OF CONTROLLING A POWERED AIR PURIFYING RESPIRATOR

CROSS REFERENCE TO RELATED APPLICATIONS

This application is a national stage filing under 35 U.S.C. 371 of PCT/US2011/019778A1, filed Aug. 11, 2010, which claims priority to Great Britain Application No. 0914013.8, filed Aug. 11, 2009, the disclosure of which is incorporated by reference in its/their entirety herein.

BACKGROUND

The present invention relates to a blower system, and method of controlling a blower system, for use in a powered air purifying respirator (PAPR).

SUMMARY

When working in areas where there is known to be, or there is a risk of there being, dusts, fumes or gases that are potentially hazardous or harmful to health, it is usual for the worker to use a respirator. A common type of respirator used in such circumstances is a powered air purifying respirator (PAPR). A PAPR has a blower system comprising a fan powered by an electric motor for delivering a forced flow of air to the respirator user. A turbo unit is a housing that typically contains the blower system, and is adapted to connect a filter to the blower system. Air is drawn through the filter by the blower system and passed from the turbo unit through a breathing tube to a headpiece, for example, a helmet or headtop, thus providing filtered air to the user's breathing zone (the area around their nose and mouth). A blower system for a PAPR may also include an electronic control unit to regulate the power driving the fan. Typically, a single power supply, for example a battery, provides power for both the fan and the electronic control unit.

The electronic control unit can be used, for example, to control the power to the electric motor with the aim of maintaining a substantially uniform volumetric airflow from the blower. The term "volumetric air flow" indicates the volume of air provided to a user at any one time as opposed to the mass of air provided to a user any one time. Sufficient airflow is required by the user to ensure that the designated level of respiratory protection is maintained. However, too high an airflow can cause discomfort and excessive cooling to the user's head inside the headpiece. Too low an airflow can cause ingress of contaminants into the user's breathing zone. The electronic control unit may also be used to trigger alarms to the user, for example, to alert the user if the airflow falls below a designated level, or to alert the user that the filters may be blocked with dust and need to be replaced. It has previously been proposed to control the power to the fan motor of a PAPR blower system in dependence on a combination of motor voltage, motor current and motor speed. Examples of blower control systems of that type are described in US 2008/0127979 and U.S. Pat. No. 7,244,106.

US 2008/0127979 describes an electronic control system using a pulse width modulation (PWM) ratio as a control variable to generate a specific motor speed and a respective airflow. The PWM ratio is read from a calibration curve stored in the electronic control system.

U.S. Pat. No. 7,244,106 describes a control unit that detects the power consumption of the motor and the speed of the fan and compares this with a characteristic curve, stored in a memory, for the motor for a given airflow from the fan. In the event of a deviation from this characteristic curve, the control unit regulates a change in the voltage supplied to the motor to maintain a constant airflow.

A predetermined volumetric airflow of filtered air is usually intended to be delivered to the user of a PAPR to give a certain level of protection from the ingress of particles or gases into their breathing zone. Currently available systems often provide a volumetric airflow that is much higher than is actually needed, rather than risk a situation where too little air is provided. A higher airflow usually means that the battery life between charges is reduced or that larger batteries are required, as more power is consumed to provide the higher airflow. Filter life is also reduced by providing a higher airflow as excess contaminated air is moved through the filters leading to unnecessary filtering and premature clogging or saturation of the filters. As filters are consumable and require replacement many times over the lifetime of the PAPR, this can lead to higher running costs. A further problem is that in many PAPRs a low airflow alarm is required, alerting the user to the fact that the airflow has fallen below a predetermined level. Where an inaccurate airflow measuring or control system is used, the alarm level is often set at an artificially high level to ensure that the user is always safe. This in turn can lead to filters being changed too frequently or the user leaving the workplace unnecessarily. Hence it can be seen that more accurate control of the airflow at a particular volumetric airflow can lead to improved battery lives between charges or the use of smaller and lighter batteries, improved filter life and reduction of premature low airflow alarms. All of these factors can also lead to the improved productivity of the user. It is desirable therefore to use a method of controlling a PAPR that minimizes such issues whilst maintaining or improving the overall functionality of the PAPR.

The present invention aims to address these problems by providing a method of controlling a powered air purifying respirator blower system to deliver a substantially uniform volumetric airflow to a user, the system comprising a fan powered by an electric motor, controlled by an electronic control unit for delivering a forced flow of filtered air to a user, and the electronic control unit having at least two calibration values for the electrical characteristics of the electric motor stored therein, comprising the steps of: determining one of (a) ambient air density or (b) ambient air temperature and ambient air pressure; and adjusting an electrical characteristic of the electric motor in response to said determination and said at least two calibration values.

By taking into consideration one or more ambient air characteristics when controlling the blower, the volumetric airflow delivered to the user can be controlled more accurately and hence better functionality of the PAPR can be provided.

The present invention also provides an air purifying respirator blower system, comprising a fan powered by an electric motor, and an electronic control unit operable to adjust an electrical characteristic of the motor in accordance with a predetermined correlation between the speed of the fan and the applied motor electrical characteristic for a selected substantially uniform volumetric airflow from the fan; wherein the system further comprises at least one sensor adapted to be in communication with the electronic control unit and arranged to determine one of (a) ambient air density or (b) ambient air temperature and ambient air pressure, the electronic control unit being operable in response to the determine (a) ambient air density or (b) ambient air temperature and ambient air pressure, to adjust an electrical characteristic of the motor to maintain the selected substantially uniform volumetric airflow from the fan.

Other features of the invention will be apparent from the attached dependent claims.

BRIEF DESCRIPTION OF THE DRAWINGS

By way of example only, embodiments of the invention will now described below with reference to the accompanying drawings, in which.

DETAILED DESCRIPTION

Figure 1:
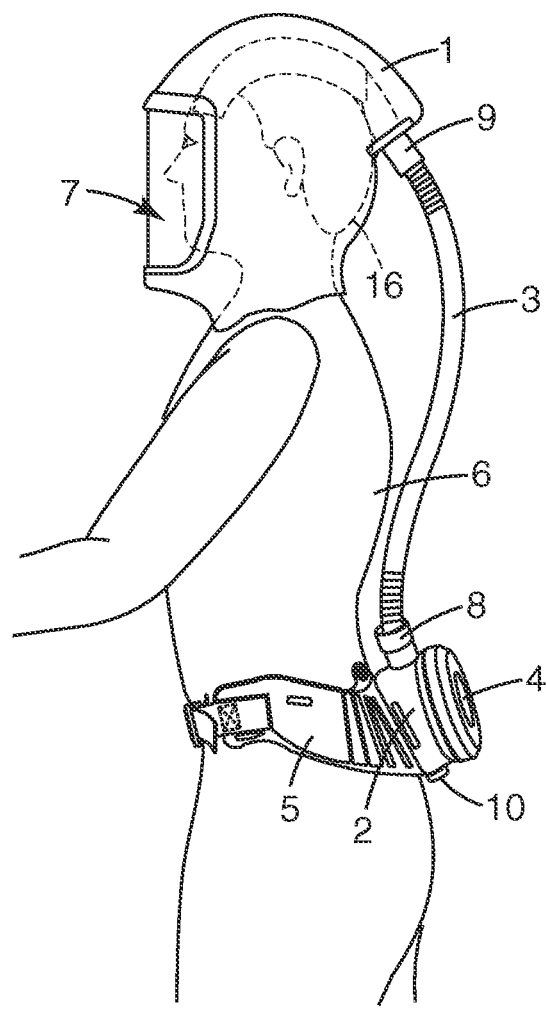
FIG. 1 is a diagrammatical illustration of a powered air purifying respirator.

The present invention is based on the realization that the above-described problems experienced when PAPRs are used at high altitude or below sea level are caused by changes in ambient air density. Ambient air pressure, and hence ambient air density, can vary considerably when working at high altitude or below sea level. Changes in ambient air density can also result from normal fluctuations in ambient air temperature or ambient air pressure. The present invention enables the volumetric air flow delivered to a PAPR user to be controlled more accurately by taking account of the ambient air density and hence provide better functionality of a PAPR. This is done by changing an electrical characteristic, such as the voltage, current or power of the electric motor running the PAPR in accordance with a pre-determined calibration procedure.

The term "ambient" is used herein to describe the air density, temperature, pressure or humidity experienced by the user. Ambient air density is affected, for example, by ambient air pressure, ambient air temperature and ambient air humidity. The degree to which each of these factors effect the ambient air density is different, with air pressure usually having the greatest effect. Although air temperature and humidity are believed to have a lesser effect, these factors may still be taken into account when determining ambient air density and volumetric airflow.

The term "humidity" can be taken to mean any of absolute humidity, specific humidity or relative humidity. Absolute humidity is defined as being the quantity of water in a particular volume of air. Specific humidity is defined as being the ratio of water vapour to air. Relative humidity is defined as being the ratio of the partial pressure of water vapour in a gaseous mixture of air and water vapour to the saturated vapour pressure of water at a given temperature. Measurement of any of the absolute, specific or relative humidity value may be carried out as appropriate, depending on user preference and ambient conditions.

By way of example only, the effects of ambient air pressure, temperature and humidity over the ranges that a PAPR could foreseeably be used include:

Ambient Pressure—changing the atmospheric pressure from 1100 mbar e.g. at sea level, to 750 mbar e.g. 2500 meters above sea level, would see a reduction in air density to approximately 68% of the initial air density;

Ambient Temperature—changing the air temperature from 0° C. up to 50° C. would see a reduction in air density to approximately 84% of the initial air density.

Ambient Humidity—changing the ambient humidity, relative humidity RH, from 0% RH to 100% RH, at 0° C. would see a reduction in air density to approximately 99.7% of the initial air density, at 25° C. would see a reduction in air density to approximately 98.8% of the initial air density, and at 50° C. would see a reduction in air density to approximately 96.5% of the initial air density.

Therefore, applying air density compensation based on only ambient air pressure can compensate for considerable variation and inaccuracies. Compensation based on both pressure and temperature improves accuracy further still. Compensation based on humidity, temperature and pressure gives the best possible accuracy, but only marginally better than temperature and pressure.

Each of the embodiments described below employ a turbo as shown in FIG. 1. FIG. 1 is a diagrammatical illustration of a powered air purifying respirator. The PAPR comprises a headpiece 1, a turbo unit 2, a breathing tube 3, a filter 4 and a belt 5. The headpiece 1 is worn on the user's 6 head. It at least partially encloses the user's 6 head to form a breathing zone 7, that is, the area around their nose and mouth, so that the filtered air is directed to this breathing zone 7. The turbo unit 2 may be attached to a belt 5 to enable it to be secured about the user's torso. The turbo unit 2 houses a blower system (not shown), which draws the air through the PAPR system using a fan (also not shown). The turbo unit 2 supplies air to the headpiece 1 through the breathing tube 3 which is connected between the outlet 8 of the turbo unit 2 and the inlet 9 of the headpiece 1. The turbo unit 2 is fitted with a filter 4, which can be either inside the turbo unit or attached to the turbo unit as shown in FIG. 1 such that the filter 4 is in the airflow path, preferably disposed upstream of a fan opening of the blower. The purpose of providing the filter 4 is to remove particles and/or gases and/or vapours from the ambient air before the air is delivered to the user 6. The battery pack 10, which is fitted to the turbo unit 2 provides power to the electronic control unit 23 and to the motor 22 (both shown in FIG. 2 as discussed below).

The following illustrates how the blower system in accordance with a first embodiment of the present invention may operate. In the following examples, the structural components of the PAPR may be assumed to be as described above with reference to FIGS. 1 and 2.

Figure 2:
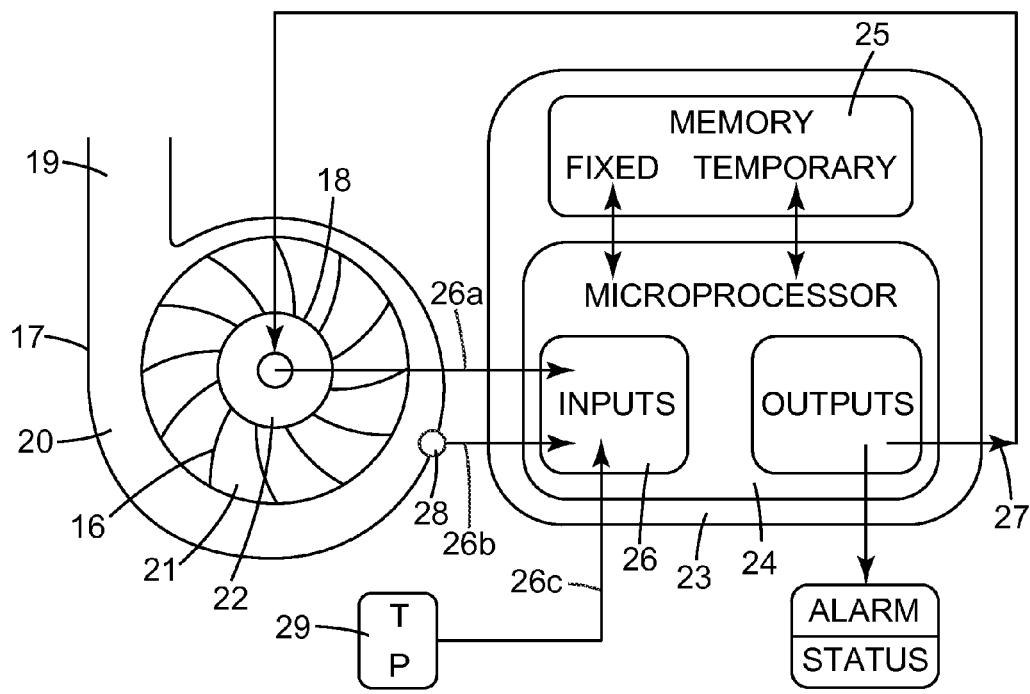
FIG. 2 shows a block diagram of a blower system according to a first embodiment of the present invention.

FIG. 2 shows a block diagram of a blower system according to a first embodiment of the present invention. This blower system is housed within the turbo unit 2 illustrated in FIG. 1. In accordance with this embodiment of the invention the blower 20 includes a housing 17 having an inlet 18 and an outlet 19. The blower 20 further includes a fan 21, having a plurality of blades 16, driven by a motor 22. The blower 20 is controlled by an electronic control unit 23 which regulates the power provided to the motor 22.

It is desirable that a predetermined, substantially uniform volumetric airflow be supplied to the user's breathing zone 7, such that when the user 6 inhales, sufficient filtered air is available for the user 6 to breathe easily and normally, and no potentially contaminated ambient air is inhaled. A substantially uniform volumetric airflow is preferably, but not limited to, an airflow rate where the deviation from the desired or predetermined airflow is in the range −5 to +15 liters per minute.

In order to achieve a substantially uniform volumetric airflow at a particular volumetric airflow rate, either the airflow must be known or a correlation between various operating parameters and the required airflow must be known. It is possible to monitor the volumetric airflow by using a discrete airflow sensor. However, in the present invention, it has been appreciated that various operating parameters of the fan 21 and motor 22 including fan or motor speed, motor voltage, motor current and motor power can be used to determine the volumetric airflow as described below.

With further reference to FIG. 2, the blower system comprises an electronic control unit 23 that functions to maintain a substantially uniform, preferably constant, volumetric airflow to the headpiece 1. The electronic control unit 23 comprises: a microprocessor device 24, such as a single chip microcontroller, for computing information; a memory device 25, such as flash RAM, for storing information, for example, calibration data; sensor input receivers 26a, 26b, 26c, for receiving data from sensors such as motor current sensors and fan speed sensors; and an output controller 27, such as a pulse width modulation controller chip, for providing power to the motor 22 and any alarm or status indicators, such as buzzers or light emitting diodes, that may be included in the PAPR. The memory device 25 of the electronic control unit 23 has two parts: a fixed memory and a temporary memory. The fixed memory is populated with data, for example, at the time of manufacture, comprising the algorithms and programs for enabling the microprocessor 24 to carry out its calculations and procedures, and calibration information from the factory calibration procedure. The temporary memory is used for storing data and information such as sensor readings and fan operating parameter data collected during start-up and running of the turbo unit 2. If desired, this data maybe erased when the turbo unit 2 is powered down.

A three-phase square-wave, brushless, direct current motor 22 may be used to drive the fan 21 of the blower 20. The equations below, EQ. 1, EQ. 2 and EQ. 3 are well known and show the relationships between the main parameters of such a motor.

$$T = k_T I \quad \text{(Eq. 1)}$$

$$E = k_E \frac{2\pi}{60} n \quad \text{(Eq. 2)}$$

$$V_s = E + R_m I \quad \text{(Eq. 3)}$$

$T$ Air gap torque($mNm$)
$k_T$ Torque constant($mNm/A$)
$I$ Motor current($A$)
$E$ Back EMF($V$)
$k_E$ Back EMF constant($Vs/\text{rad}$)
$n$ Speed(rpm)
$V_s$ Applied motor voltage($V$)
$R_m$ Winding resistance($\Omega$)

As explained above, the blower 20 comprises a fan 21 which is used to move air through the filter(s) 4 and deliver it to the user 6. The fan 21 illustrated in the drawings is of the type often known as a centrifugal or radial fan, meaning that the air enters the fan in the direction of the fan axis and exits in a radial direction to the fan.

The fan law equations below show how the performance of the fan 21 changes when the fan speed and the air density are changed.

$$Q_{V2} = Q_{V1} \frac{n_2}{n_1} \quad \text{(Eq. 4)}$$

-continued $$p_2 = p_1 \left(\frac{n_2}{n_1}\right)^2 \frac{\rho_2}{\rho_1} \quad \text{(Eq. 5)}$$

$$T_2 = T_1 \left(\frac{n_2}{n_1}\right)^2 \frac{\rho_2}{\rho_1} \quad \text{(Eq. 6)}$$

$$P_2 = P_1 \left(\frac{n_2}{n_1}\right)^3 \frac{\rho_2}{\rho_1} \quad \text{(Eq. 7)}$$

$Q_v$: Volumetric air flow($l/\min$)
$p$: Fan pressure($Pa$)
$T$: Torque($mNm$)
$P$: Input shaft power($W$)
$n$: Fan speed(rpm)
$\rho$: Air density(kg/m3)

It can be seen from equation EQ. 4 that in order to maintain a substantially uniform volumetric airflow, the fan speed element of the calibration point must remain unchanged.

$$n_2 = n_1 \quad \text{(8)}$$

Furthermore, combining equations EQ. 1, EQ. 2, EQ. 3 and EQ. 6 shows how to move the applied motor voltage element of the calibration point when the air density changes.

$$V_{S2} = V_{S1} + \frac{\rho_2 - \rho_1}{\rho_1} I_1 R_m \quad \text{(Eq. 9)}$$

$$V_{S2} = V_{S1} + \frac{\rho_2 - \rho_1}{\rho_1}\left(V_{S1} - k_E \frac{2\pi}{60} n_1\right) \quad \text{(Eq. 10)}$$

$n_1, V_{S1}$: Calibration point as air density $\rho_1$
$n_2, V_{S2}$: Calibration point at air density $\rho_2$
$I_i$: Motor current($A$) at air density $\rho_3$
$R_m$: Motor winding resistance($\Omega$)
$V_s$: Applied motor voltage($V$)
$n$: Fan speed(rpm)
$\rho$: Air density(kg/m3)
$k_E$: Back EMF constant($Vs/\text{rad}$)

In conclusion, it can be seen that in order to compensate for changes in ambient air density, the fan speed element of the calibration point does not need to be changed (see equation EQ. 8). However, the applied motor voltage element of the calibration point does need to be changed when the ambient air density changes, according to equations EQ. 9 and EQ. 10.

Figure 3:
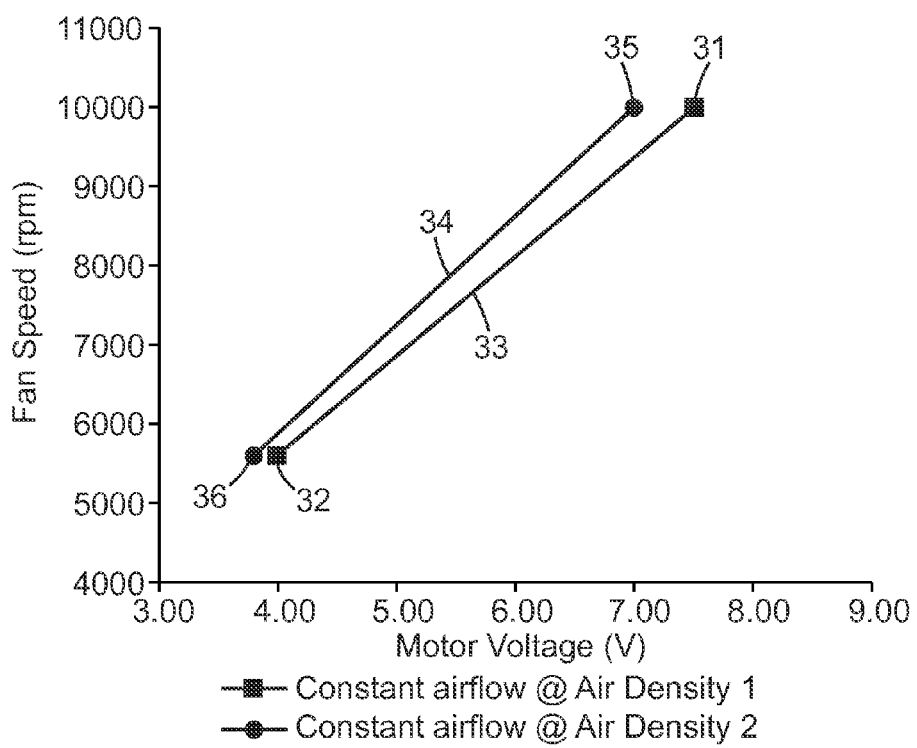
FIG. 3 shows a calibration chart for an electronic control unit of a blower system according to a first embodiment of the present invention.

FIG. 3 shows a calibration chart for an electronic control unit of a blower system according to a first embodiment of the present invention. This is used during the procedure for determining a substantially uniform volumetric airflow. The electronic control unit 23 refers to the calibration chart 30, which indicates a directly proportional relationship between fan speed and applied motor voltage. A predetermined substantially uniform volumetric airflow is represented by two calibration points, high 31 and low 32. Each calibration point comprises information about applied motor voltage and fan speed. To maintain a substantially uniform volumetric airflow, for example, as the filter(s) 4 progressively clog with dust and fumes and hence the performance of the blower 20 changes, the electronic control unit 23 tracks along the line 33 between the two calibration points 31, 32. This may be done using a look up table or other data array. The electronic control unit takes a measurement of the fan speed using a sensor 28, compares it with the calibration line and then applies the appropriate motor voltage 29 to maintain the pre-determined volumetric airflow.

In the present invention, the realization that the calibration points, and hence the tracking line, are optimal for one specific air density, is utilised. By taking measurements of air density, the calibration points can be moved appropriately to account for the actual air density and maintain a substantially uniform volumetric airflow.

The fan speed is measured by means of a sensor 28 fitted to the blower 20 that measures the number of revolutions of the fan 21 in a given time. A suitable type of sensor for measuring the fan speed would be a Hall effect device, although other types of sensor could be used. The fan speed information is received by the microprocessor device 24 of the electronic control unit 23. The applied voltage 27 to the electric motor 22 is monitored directly by an input 26 to the microprocessor 24 of the electronic control unit 23.

Sensors for measuring the ambient temperature and ambient pressure may be used to determine the ambient air density. A suitable low cost sensor for measuring both the ambient pressure and temperature is a solid state type sensor from the SCP1000 series of sensors manufactured by VTI Technologies Oy, FI-01621, Vantaa, Finland. Such temperature and pressure sensors are cheaper, more widely available, more reliable and easy to position than discrete airflow sensors. Alternatively, separate temperature and pressure sensors could also be used, if desired; most solid state temperature and pressure sensors capable of measuring atmospheric temperature or pressure would be suitable.

The temperature and pressure sensor 29 is preferably located in the turbo unit 2. It is important that the housing is not sealed so that the sensor is open to the atmosphere. The location of the sensor 29 should be chosen such that it is not significantly affected by any other parts of the blower 20 or electronic control unit 23. This is to avoid fluctuations in temperature during use caused by the operation of other blower components as this may give false ambient temperature measurements. The sensor 29 should not be located in an area of the turbo unit 2 that is pressurised or depressurised during use, as this would also give rise to erroneous measurements.

The following steps are carried out when the turbo unit 2 is initially calibrated during manufacture. High 31 and low 32 calibration points for each predetermined substantially uniform volumetric airflow are determined. Fan speed and applied motor voltage 32 for each calibration point are also measured and saved in the electronic control unit's fixed memory 25. At least one of the ambient pressure and temperature at calibration is measured by the sensor(s) 29 via the electronic control unit 23 and saved in the fixed memory 25. The air density is calculated by the microprocessor 24 using an appropriate algorithm and saved in the fixed memory as the nominal air density. Alternatively the air density is measured directly, and the same calibration process carried out.

The calibration points will have to be moved as air density changes by the air density compensation procedure described below. When ambient air pressure and temperature have been measured as part of the calibration process, the following steps are used. At start-up of the turbo unit, that is, when the turbo unit is switched on, the sensors 29 may measure both the actual ambient pressure and temperature, which is likely to be different to that measured at the point of factory calibration. The actual air density is then calculated from these values by the microprocessor 24 and saved in the temporary memory. The nominal applied motor voltage component of all the calibration points 31, 32 stored in the fixed memory is read out by the microprocessor 24. Each component is then modified using the expression of equation EQ. 10, and the air density information previously saved in the fixed memory at the time of factory calibration and the actual air density information saved in the temporary memory. The modified values are and saved in temporary memory as corrected calibration points. As with the calibration procedure, an upper 35 and a lower 36 corrected calibration points are saved.

The nominal fan speed part of the calibration points 31, 32 is not changed. The new corrected calibration points can now be used in the substantially uniform volumetric airflow maintenance procedure. For example, as the filter(s) 4 progressively clog, for example, with dust and/or fumes, and the performance of the blower 20 changes, the electronic control unit 23 tracks along a line 34 between the two corrected calibration points 35, 36. The air density compensation procedure is repeated at regular intervals, for example every ten minutes or every hour, and airflow adjusted accordingly if necessary.

Thus the above procedure can enable the turbo unit 2 to deliver substantially uniform volumetric airflow rates which are compensated for air density fluctuations.

The benefit of more accurate control of the substantially uniform volumetric airflow is that the airflow does not need to be set artificially high to take account of changes or fluctuations in air density. In contrast, the substantially uniform volumetric airflow can be set at a level where the required respiratory protection is exceeded but the life of the batteries 10 between charges and the life expectancy of the filter(s) 4 is maximised. Thus the running costs of the PAPR may be reduced, and the amount of downtime for the user 6 should also be reduced, as battery 10 life between charges is longer and filter(s) 4 require changing less frequently.

Typically, air should be delivered to the user 6 at a predetermined substantially uniform volumetric airflow. In certain circumstances, however, the user 6 may need to be able to adjust the airflow to a different level. For example if the user 6 is working particularly hard and breathing more deeply or at a faster rate than usual, they may desire to increase the airflow. To enable this, the electronic control unit is preferably provided with a discrete range of two, three or more different, pre-set airflow values, for example, 160 liters per minute or 180 liters per minute. However, the control unit is usually set such that it is not possible for the user 6 to inadvertently reduce the airflow below a level where the minimum protection is given.

A further embodiment of the present invention using an alternative air density compensation procedure will now be described.

Figure 4:
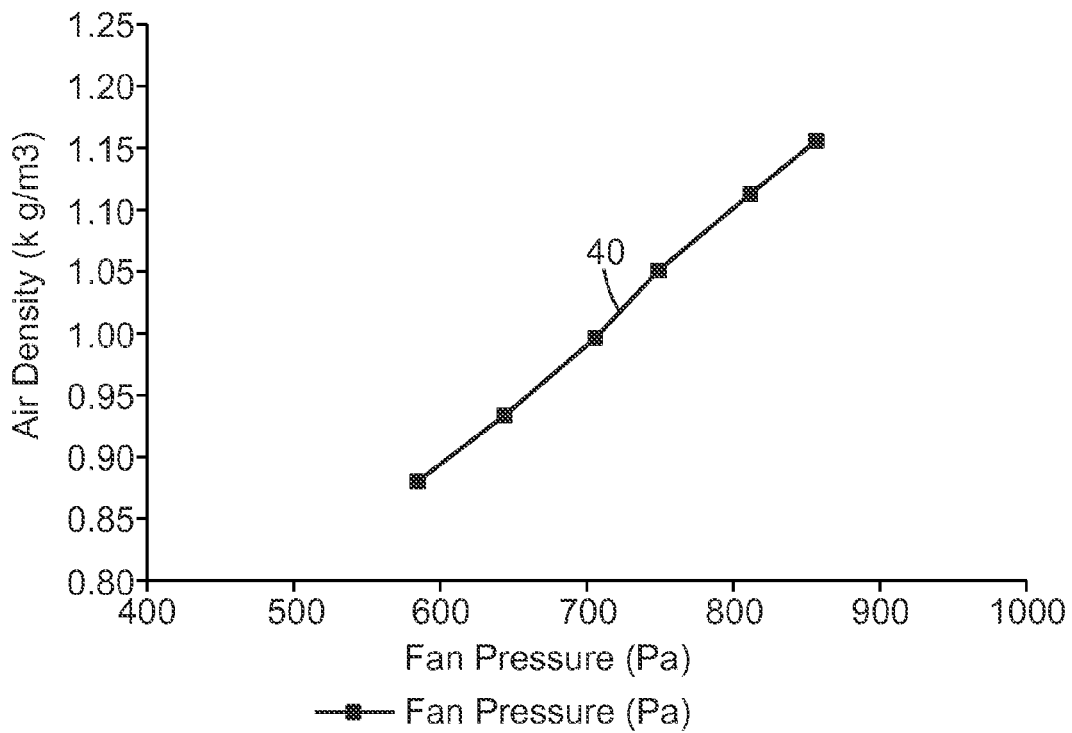
FIG. 4 shows the correlation between air density and fan pressure for a second embodiment of the present invention.
Figure 5:
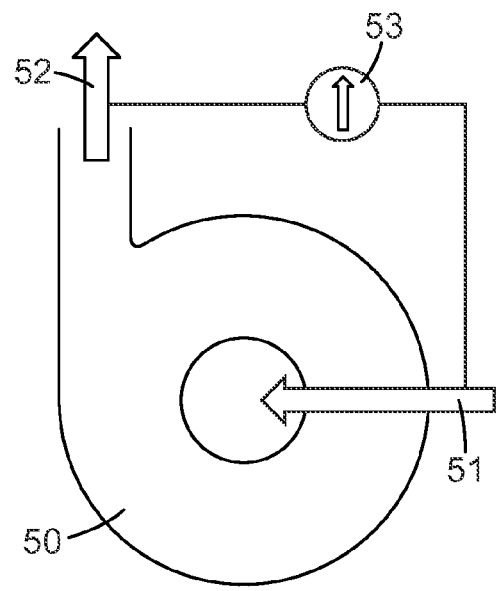
FIG. 5 shows a block diagram of a blower with a fan pressure measurement sensor for a second embodiment of the present invention.

FIG. 4 shows the correlation between air density and fan pressure for a second embodiment of the present invention. For a radial fan used in PAPR blower system, there is a correlation 40 between the air density and the fan pressure, at a predetermined fan speed and a predetermined motor voltage. FIG. 5 shows a block diagram of a blower 50 with a fan pressure measurement sensor for an embodiment of the present invention. The fan pressure is a measurement of the differential pressure between the inlet 51 of the fan and the outlet 52 of the fan as shown in FIG. 5. Hence the fan pressure can be measured by means of a differential pressure transducer 53 fitted to the blower. The air density calculation can be performed at start-up of the PAPR by running the blower system for a short period of time at the predetermined fan speed and motor voltage conditions, during which, the fan pressure can be measured and the ambient air density determined. The correlation information can be stored in the memory of the electronic control unit and the calculation of air density conducted by program in the microprocessor.

A third embodiment in accordance with the present invention uses an alternative method of determining air density compensation. The user 6 is required to create a certain condition to enable the air density measurement to be achieved. At the point of factory calibration during manufacture of the PAPR, a known load condition is created. A known load condition is a previously measured pressure loading on the blower that is not affected by unknown pressure influences such as partial clogging of the filter. The known load condition could be either a minimum load, which is when no filters or breathing tube 3 are connected to the turbo unit 2, or a maximum load which is when the outlet 8 of the turbo unit 2 is blocked. Under whichever one of these conditions that is chosen, the motor voltage is fixed and the fan speed is measured and both values, together with the ambient air density at the time of calibration are stored in the electronic control unit memory. During use, the user 6 is required to create the same load condition and start a calibration sequence. The electronic control unit would then start the blower 20 running at the same motor voltage as the factory calibration. The fan speed is then measured and compared to the fan speed during calibration and together with the air density at calibration, used to determine the current air density. The user 6 can then set up the PAPR for use and the air density compensation procedure can be applied.

The method in accordance with the third embodiment can use any two of the parameters motor voltage, motor current or fan speed, by holding one parameter constant and measuring the other, in combination with either the maximum or minimum load condition.

The air density also may be determined by various means, alternative to those described previously. In accordance with a fourth embodiment of the present invention, the air density can be measured or calculated independently of the PAPR. This may be, for example, by a separate, dedicated air density measuring instrument. A PAPR can be enabled to allow the user 6 to input the air density via a man-machine-interface such as a keypad or a touch screen. In this embodiment, the electronic control unit would not need to perform any air density calculations when applying the air density compensation procedure.

A PAPR in accordance with this embodiment of the present invention can also be enabled to allow the atmospheric pressure, ambient temperature, or ambient humidity, or preferably a combination of these parameters to be inputted into the electronic control unit via a suitable interface. The electronic control unit can be enabled to calculate the ambient air density prior to performing the air density compensation procedure. This method would require the user 6 to measure the parameters independently from the PAPR using suitable measuring instruments.

Air density compensation may be achieved by the user 6 inputting the altitude into the electronic control unit. The altitude can be obtained by the user 6 taking a measurement with a suitable instrument, or by reference to a map or GPS system. The electronic control unit can be enabled to estimate the ambient pressure and hence an approximation of air density at the given altitude by using pre-programmed information stored in its memory.

Although in the above-described examples and embodiments of the present invention the electrical characteristic of the electric motor 22 used to control the volumetric airflow is voltage, t is easily envisaged that the current or power output of the electric motor 22 could be used as an alternative, in both the calibration process and during use.

The headpiece 1 may have a variety of configurations. Although a hood is illustrated in FIG. 1, the headpiece 1 could be a helmet, a mask, or a full suit, provided it covers at least the orinasal area of the user's face, to direct air to the user's breathing zone 7. Full face respirators or half face mask respirators may be used as headpieces in conjunction with the embodiment of the present invention. Alternative ways of supporting the turbo unit 2 on a user's body 6 or otherwise are also within the scope of the present disclosure. For example, a backpack-type support may be provided for the turbo unit 2.

Generally when using a helmet or hood in a PAPR, a higher constant airflow is desired, than when a mask is used. Where the user 6 may change between helmets and masks, or where the turbo unit 2 is shared between multiple users, it is desirable to have a range of substantially uniform volumetric airflows. The range of substantially uniform volumetric airflows may be continuously variable between a first airflow rate and a second airflow rate, or may be a series of discrete steps between the first and second airflow rates. For example, a system may be set to a first predetermined airflow value for use with a PAPR and to a second, lower, predetermined airflow value for use with a mask.

A PAPR with air density compensation as described above may also be designed with smaller and lighter batteries, and smaller and lighter or lower profile filters. The turbo unit 2 may be fitted with more than one filter 4 in the airflow path, to remove particles and/or gases and vapours from the ambient air before the air is delivered to the user 6. The filter or filters 4 may be inside the turbo unit 2 or fitted to the outside of the turbo unit 2. The battery 10, may be attached to the turbo unit 2 as illustrated in FIG. 1 or may be remote from the turbo unit 2 and connected by a suitable cable.

The motor used in the embodiments described above is a three-phase square-wave brushless direct-current motor. Alternatively, a segmented commutator brushed direct current motor may be used. As the equations EQ. 1, EQ. 2 and EQ. 3 are known to be true for both the brushed and brushless types of motors. Consequently, most types of direct current motors known within the respirator industry could be used in the blower 20 of the present invention. Other non-direct current types of motors that are know in the art for PAPR applications could be used as an alternative to that in the embodiment described above. Alternative motor control methods, such as pulse width modulation are also envisaged as being within the scope of the present invention.

What is claimed is:

1. A method of controlling a powered air purifying respirator blower system to deliver a substantially uniform volumetric airflow to a user, the system comprising a fan powered by an electric motor, controlled by an electronic control unit for delivering a forced flow of filtered air to a user, and the electronic control unit having at least two calibration values for the electrical characteristics of the electric motor stored therein, comprising the steps of:

determining ambient air temperature and ambient air pressure; and adjusting an electrical characteristic of the electric motor in response to said determination and said at least two calibration values to account for a change in ambient air density such that a fan powered by the electric motor delivers a substantially uniform volumetric flow rate.

2. The method of claim 1, wherein at least one of the ambient air temperature and ambient air pressure are measured.

3. The method of claim 1, wherein at least one of the ambient air temperature and ambient air pressure are determined from user input.

4. The method of claim 1, wherein the substantially uniform volumetric airflow from the fan is variable.

5. The method of claim 4, wherein the substantially uniform volumetric airflow from the fan is variable and chosen from any one of a limited number of pre-selected airflow values.

6. The method of claim 1, further comprising the step of detecting a speed of the fan and an electrical characteristic applied to the electric motor, wherein the step comprises detecting the speed of the fan and the applied motor electrical characteristic using sensors connected to the electronic control unit.

7. The method of claim 1, wherein the step of measuring the ambient air temperature and ambient air pressure comprises measuring the ambient air temperature and ambient air pressure using at least one sensor contained within a housing together with the fan.

8. The method of claim 1, wherein the step of measuring the ambient air temperature and ambient air pressure comprises measuring the ambient air temperature and ambient air pressure using at least one sensor arranged external to a housing of the fan.

9. The method of claim 1, wherein the electrical characteristic is voltage.

10. The method of claim 1, wherein the substantially uniform volumetric flow rate is within −5 liters per minute and +15 liters of a desired predetermined airflow.

11. An air purifying respirator blower system, comprising a fan powered by an electric motor, and an electronic control unit operable to adjust an electrical characteristic of the motor in accordance with a predetermined correlation between the speed of the fan and the applied motor electrical characteristic for a selected substantially uniform volumetric airflow from the fan;

wherein the system further comprises one or more sensors adapted to be in communication with the electronic control unit and arranged to determine ambient air temperature and ambient air pressure, the electronic control unit being operable in response to the ambient air temperature and ambient air pressure, to adjust an electrical characteristic of the motor to account for a change in ambient air density and maintain the selected substantially uniform volumetric airflow from the fan.

12. The system of claim 11, comprising a housing, wherein the housing further includes at least one filter positioned in the airflow path of the fan.

13. The system of claim 11, comprising a housing, wherein the housing further includes a power supply for the motor.

14. The system of claim 11, wherein the motor is a three-phase square-wave brushless direct-current motor.

15. A powered air purifying respirator comprising a blower system as recited in claim 11 and either a respirator headpiece or a full-face respirator in fluid communication therewith.

* * * * *